US006744947B2

(12) United States Patent
Burns et al.

(10) Patent No.: US 6,744,947 B2
(45) Date of Patent: Jun. 1, 2004

(54) HIGH POWER, LOW NOISE, FLUORESCENT DEVICE AND METHODS RELATED THERETO

(75) Inventors: William K. Burns, Alexandria, VA (US); Robert P. Moeller, Fort Washington, MD (US); Lew Goldberg, Fairfax, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 136 days.

(21) Appl. No.: 09/965,247

(22) Filed: Sep. 28, 2001

(65) Prior Publication Data

US 2003/0063848 A1 Apr. 3, 2003

(51) Int. Cl.[7] .............................. G02B 6/26; G02B 6/42
(52) U.S. Cl. ......................... 385/27; 385/39; 385/142; 385/147; 385/901; 359/341.1; 359/341.4; 372/6
(58) Field of Search ........................... 365/1–3, 11, 27, 365/142, 147, 901; 359/337.11, 337, 341.1, 341.4; 372/6, 26, 27

(56) References Cited

U.S. PATENT DOCUMENTS

| 4,150,402 | A | | 4/1979 | Tietze et al. ................. 358/280 |
|---|---|---|---|---|
| 5,296,545 | A | | 3/1994 | Huber ......................... 359/111 |
| 5,303,314 | A | * | 4/1994 | Duling et al. .................. 385/11 |
| 5,363,363 | A | | 11/1994 | Gage ........................... 369/116 |
| 5,365,335 | A | | 11/1994 | Sorin ........................... 356/345 |
| 5,430,822 | A | | 7/1995 | Shigematsu et al. ......... 385/123 |
| 5,481,391 | A | * | 1/1996 | Giles ........................... 359/337 |
| 5,521,751 | A | * | 5/1996 | Aida et al. .................... 359/337 |
| 5,633,741 | A | | 5/1997 | Giles ........................... 359/124 |
| 5,680,491 | A | | 10/1997 | Shigematsu et al. .......... 385/24 |
| 5,700,949 | A | | 12/1997 | Baney .......................... 73/1 R |
| 5,854,865 | A | | 12/1998 | Goldberg ...................... 385/31 |
| 5,867,064 | A | * | 2/1999 | Van Horn et al. ........... 330/149 |
| 5,867,267 | A | | 2/1999 | Benech et al. ............... 356/345 |
| 5,926,600 | A | | 7/1999 | Palvalth ....................... 385/142 |
| 5,943,162 | A | * | 8/1999 | Kosaka et al. .......... 359/341.31 |
| 6,023,362 | A | * | 2/2000 | Walker et al. ............... 398/184 |
| 6,049,415 | A | * | 4/2000 | Grubb et al. ............. 359/341.1 |
| H1926 | H | * | 12/2000 | Carruthers et al. ............. 372/6 |
| 6,297,903 | B1 | * | 10/2001 | Grubb et al. ............. 359/341.3 |
| 6,490,070 | B1 | * | 12/2002 | Adams et al. ............... 398/131 |
| 2002/0159668 | A1 | * | 10/2002 | Williams et al. ............... 385/3 |

OTHER PUBLICATIONS

Dagenais et al, Low–frequency Intensity Noise Reduction For Fiber–Optic Sensor Applications, 8th Optical Fiber Sensors Conference, Jan. 29–31, 1992, pp177–180.

Tatam et al, A Fibre Optic Frequency Shifter Utilising Stimulated Brillouin Scattering in Birefringent Optical Fibre, 8th Optical Fiber Sensors Conference, Jan. 29–31, 1992, pp. 181–184.

(List continued on next page.)

*Primary Examiner*—Brian Healy
*Assistant Examiner*—Daniel Petkovsek
(74) *Attorney, Agent, or Firm*—John J. Karasek; Sally A. Ferrett

(57) ABSTRACT

Featured is a high power, broadband superfluorescent source with very low relative intensity noise (RIN) including a seed source, a modulator operably coupled to the seed source and a polarization maintaining (PM) amplifier operably coupled to the modulator. The output of the seed source is processed in the modulator so the modulator outputs a polarized optical output to the PM amplifier. The PM amplifier amplifies the modulated, polarized optical output so as to provide an amplified polarized optical output therefrom. Also featured is a feedback circuit operably coupled to the PM amplifier to control the transmission of the modulator so as to minimize the amplitude fluctuations in the output signal. Such a source is advantageous in high precision fiber optical rotation sensors and multiplexed strain sensing arrays.

37 Claims, 4 Drawing Sheets

OTHER PUBLICATIONS

Kalli et al, Fibre Frequency Shifter Based Upon Stimulated Brillouin Scattering Generation in High Finesse Ring Resonators, 8th Optical Fiber Sensors Conference, Jan. 29–31, 1992, pp185–188.

Miller et al, Turning Down Laser Noise with Power Stabilizers, Photonics Spectra, Jun. 1986, pp. 129–130, 132, 134.

Moeller et al, 1.06um All–fiber Gyroscope with Noise Subtraction, Optics Letters, vol. 16., No. 23, Dec. 1, 1991, pp. 1902–1904.

Duling III et al, Single–Polarization Fibre Amplifier, Electronics Letters, vol. 28, No. 12, Jun. 4, 1992, pp. 1126–1128.

Hall, Douglas C., Burns, William K., and Moeller, Robert P., High Stability Er 3+ Superfluorescent Fiber Sources, Journal of Lightwave Technology, vol. 13, No. 7, Jul. 1995, p. 1452–1460.

Dagenais, Dominique M., Goldberg, Lew, Moeller, Robert P., and Burns, William K, Wavelength Stability Characteristics of a High–Power, Amplified Superfluorescent Source, Journal of Lightwave Technology, vol. 17, No. 8, Aug. 1999, p. 1415–1422.

* cited by examiner

HIGH POWER, LOW NOISE, FLUORESCENT DEVICE AND METHODS RELATED THERETO

FIELD OF INVENTION

The present invention relates to a method and device that produces a high power, broadband optical output, and more particularly to a device for producing a broadband polarized optical output with very low relative intensity noise (RIN).

BACKGROUND OF THE INVENTION

It is necessary and desirable in certain applications and circumstances to have the capability to produce superfluorescent light from a light source with very low relative intensity noise. Such applications for a superfluorescent source include fiber optic gyros for high precision air and sea navigation and strain sensing for any of a number of structures such as ships, airplanes, bridges, highways, or in general any civilian or military structure.

The fluctuations in amplitude of conventional superfluorescent sources can cause relative intensity noise (RIN), which in turn degrades sensor performance. One approach for removing this type of noise is noise subtraction which requires a long fiber delay and has been shown to be insufficiently effective. See for example, Moeller, R. P. and Burns, W. K. 1.06-$\mu$M all-fiber gyroscope with noise subtraction. Optics Letters 16(23), pages 1902–1904, 1991.

Other approaches to reduce noise in lasers in general include a "power stabilizer", which is a commercially used feedback approach that taps out part of the beam and controls an electronically variable attenuator, through a servo controller, in the output beam. See Miller, P. and Hoyt, C. Turning Down Laser Noise with Power Stabilizers. Photonics Spectra, June 1986, pages 129–134. This approach has been used to reduce RIN at low frequencies in a diode pumped yttrium-aluminum-garnet (YAG) laser, where the variable attenuator was a bulk-optic, electro-optic modulator. See Dagenais, D. M. et al., Low-frequency Intensity Noise Reduction for Fiber-Optic Sensor Applications. Proc. OFS '92, #P26, pages 177–1180, Monterey, 1992.

For waveguide sources where the output of the source is already in a fiber an appropriate electro-optic modulator can be used such as an integrated optical (IO) Mach Zehnder interferometer. This approach, however, is disadvantageous because of the excess loss of the modulator (typically –3 dB) and an additional loss (about –3 dB) to operate in the linear region of the modulator transfer curve (i.e., at quadrature). Another difficulty is polarization in that the output of the fiber superfluorescent source is unpolarized, while the IO interferometer has polarization dependent transfer and drive voltage characteristics.

It would thus be desirable to provide new methods and devices that yielda high power, broadband, optical light source with very low RIN. It would be particularly desirable to provide such a device and method that would yield such an optical source without a loss of intensity, and that can maintain a polarized state in comparison to prior art devices. Such devices preferably would be simple in construction and less costly than prior art devices and such methods would not require highly skilled users to utilize the device.

SUMMARY OF THE INVENTION

The present invention features a superfluorescent light producing device and a method for reducing relative intensity noise (RIN) in a superfluorescent light source that can provide a polarized optical output more particularly a broadband polarized optical output. A superfluorescent device/ source according to the present invention is particularly advantageous for applications such as high precision navigation and low noise strain sensing. In the present invention, the term broadband shall be understood to mean an output, more particularly an optical output, extending over a range of wavelengths and frequencies. In particular, the term broadband can refer to a bandwidth of the range of wavelengths of least 20 nm.

A superfluorescent light producing device or source according to the present invention includes a seed source, a modulator and a polarization maintaining amplifier. The seed source includes a light source capable of producing a light or optical output at a preselected wavelength/frequency and a first doped optical fiber that is doped with a preselected gain material and optically coupled to the light source. The first doped optical fiber, responsive to the light output from the light source, provides a broadband optical output over a range of pre-selected wavelengths and frequencies, this optical output comprises and is referred to hereinafter as the seed source optical input.

In more particular embodiments the seed source light source comprises a laser pump diode, the pre-selected gain material or dopant is one or more materials that provide an amplified spontaneous emission (ASE) or optical output at desired wavelengths and frequencies and the first doped optical fiber is optically coupled to the laser pump diode. In a more specific embodiment, the dopant is erbium, however, it is within the scope of the present invention for the dopant to include any rare-earth material, including but not limited to holmium, neodymium, praseodymium, and ytterbium.

In an exemplary embodiment, the laser pump diode is configured so as to provide a light output at about 980 nm and the first doped optical fiber is an erbium doped fiber. The 980 nm light output from the light source is inputted to the erbium doped fiber so as to cause an ASE from the erbium doped fiber. The ASE optical output from the erbium doped fiber provides an optical output at about 1550 nm that is counter propagated towards the laser pump diode in the erbium doped fiber.

The input of the modulator is operably and optically coupled to the seed source so as to receive the seed source optical input. The seed source optical input is processed within and selectively passed through the modulator so that a polarized optical output is provided therefrom. In specific embodiments, the modulator is an electro-optic modulator that also can modulate the polarized optical output.

The output of the modulator is operably and optically coupled to the polarization maintaining (PM) amplifier so the polarized optical output from the modulator is propagated to the PM amplifier. The PM amplifier, including the components making up such an amplifier, is configured and arranged so as to in effect amplify the polarized optical output from the modulator and to provide an amplified polarized optical output that can be used for a given application. This amplified polarized optical output comprises the optical output of the superfluorescent light producing device/source of the present invention.

In an exemplary embodiment, the PM amplifier includes a beamsplitter, an amplification light source being capable of producing light at a preselected wavelength, a second doped optical fiber that is doped with a preselected gain material and a retro-reflecting orthogonal polarization converter that are operably and optically coupled to each other. As indicated above, these components are configured and arranged so as to in effect amplify the modulator's polarized optical output and to provide the amplified polarized optical output.

In this exemplary embodiment, the beamsplitter is configured so that the polarized light from the modulator passes therethough and onto the second doped optical fiber. The amplification light source is disposed between the beamsplitter and the second doped optical fiber and injects light of a predetermined wavelength and frequency into the second doped optical fiber. The injected light from the amplification light source excites the rare-earth dopants in the second doped optical fiber such that an amplified broadband optical output is outputted by the second doped optical fiber.

The amplified broadband optical output from the second doped optical fiber is propagated to the retro-reflecting orthogonal polarization converter. The retro-reflecting orthogonal polarization converter reflects the amplified broadband optical output from the second doped optical fiber in an opposite direction and so the reflected amplified optical output is in an orthogonal polarization state (i.e., orthogonal with respect to the polarization state of the polarized optical output incident on the polarization converter. As the reflected amplified optical output passes back through the second doped optical fiber in the opposite direction, the reflected amplified output is further amplified. It should be recognized that in an exemplary embodiment the reflected amplified optical output has a different orthogonal polarization than that characterizing the polarized optical output from the modulator.

The retro-reflecting orthogonal polarization converter is optically coupled to the beam splitter such that this reflected amplified optical output in the orthogonal polarization state is inputted to the beamsplitter. The beamsplitter also is configured so that the reflected amplified optical output having the orthogonal polarization state is directed into another optical pathway. The other optical pathway is arranged so as to be at an angle (for example 90°) with respect to the optical pathway that inputs the polarized optical output from the modulator to the beamsplitter. The reflected amplified polarized optical output being outputted by the beamsplitter comprises the polarized light or polarized, amplified optical output of the superfluorescent light producing device/source of the present invention.

In a particular embodiment, the amplification light source is a laser pump diode, the second doped optical fiber is a doubleclad rare-earth doped optical fiber and the retro-reflector is a Faraday mirror, more particularly a Faraday rotator mirror. In a specific embodiment, the rare-earth dopants are erbium and yetterbium, however, it is within the scope of the present invention for other rare-earth materials, alone or in combination, to be utilized to dope the optical fiber.

In the foregoing, it is provided that components making up the seed source and PM amplifier are optically coupled as well as that the seed source, the modulator and PM amplifier are optically coupled to each other. It is within the scope of the present invention for any mechanism, device or material known in the art for accomplishing such optical coupling or interconnecting to be used or adapted for use with the superfluorescent light producing device/source of the present invention. In an exemplary embodiment, optical coupling is accomplished using an optical fiber such as a polarization maintaining optical fiber.

The superfluorescent light producing device/source according to the present invention further includes a control mechanism that automatically adjusts or modulates the polarized optical output from the modulator thereby modulating the amplified polarized optical output from the superfluorescent source to a desired value. More particularly, a portion of the reflected amplified polarized optical output from the beamsplitter is tapped-off and used to control the modulator by means of a feedback loop, more particularly to control the transmission of the modulator by means of the feedback loop.

In an exemplary embodiment, the feedback loop includes a detector and a noise feedback amplifier. The removed portion is converted into an electrical signal by the detector, which electrical signal is proportional to the intensity of the reflected amplified polarized optical output. This electrical signal is fedback to the modulator via the noise feedback amplifier thereby controlling the transmissivity of the modulator. In this way, amplitude fluctuations or relative intensity noise (RIN) in the reflected amplified polarized optical output that can be attributable to any one of a number of causes can be minimized automatically by the superfluorescent light producing device/source of the present invention.

Other aspects and embodiments of the invention are discussed below.

BRIEF DESCRIPTION OF THE DRAWING FIGURES

For a fuller understanding of the nature and desired objects of the present invention, reference is made to the following detailed description taken in conjunction with accompanying drawing figures wherein like reference character acter denote corresponding parts throughout the several views wherein.

DESCRIPTION OF PREFERRED EMBODIMENTS

Figure 1:
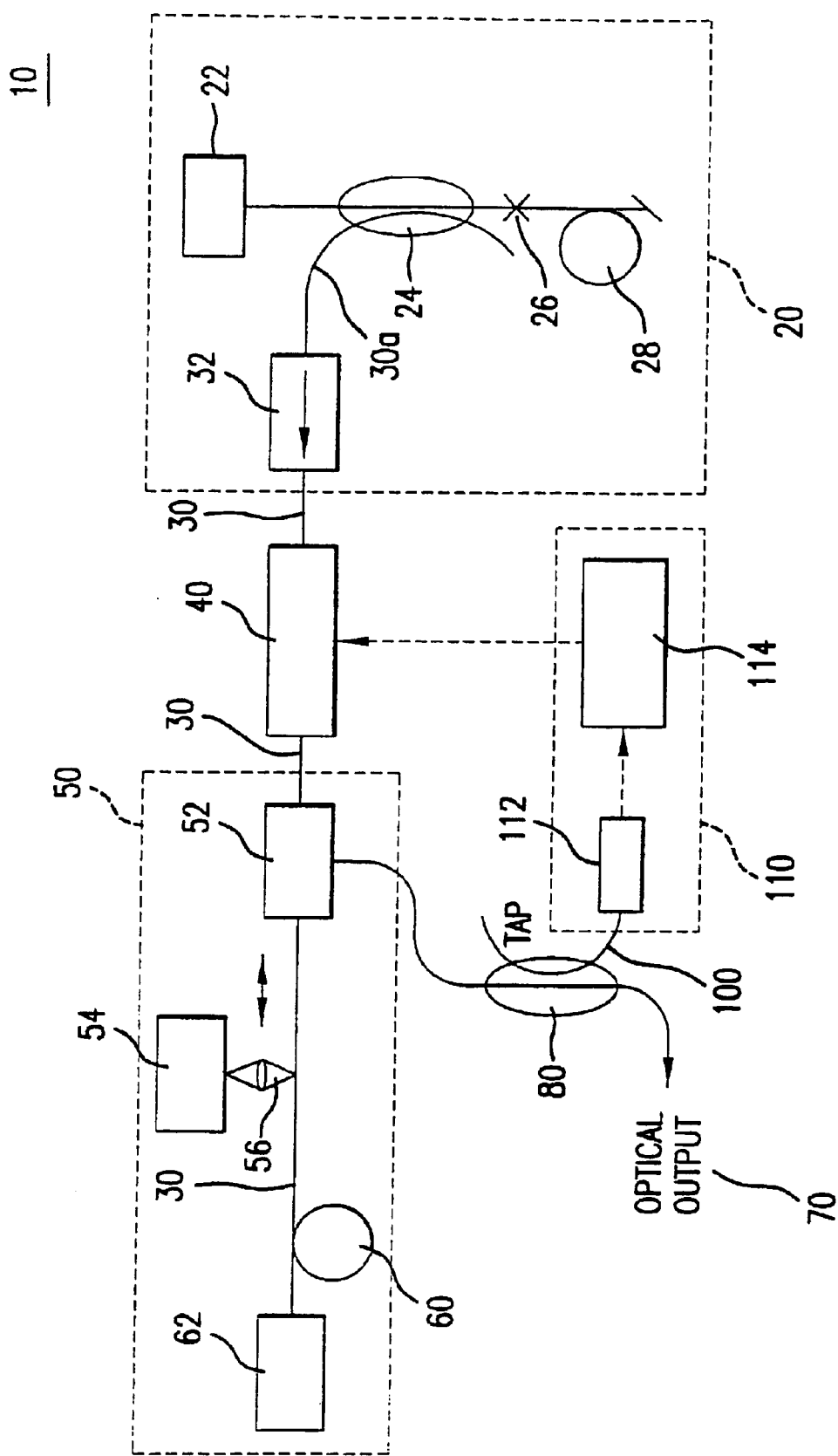
FIG. 1 is a block diagram of a superfluorescent light producing device or source according to the present invention.

Referring now to the various figures of the drawing wherein like reference characters refer to like parts, there is shown in FIG. 1 a high-power, low noise superfluorescent source 10 including a seed source 20, a modulator 40 and polarizing maintaining (PM) amplifier 50. The seed source 20, modulator 40 and PM amplifier 50 are operably and optically connected or coupled together such that one end of the modulator is coupled to the seed source and the other end of the modulator is coupled to the PM amplifier.

In an illustrative embodiment, the components of the superfluorescent source 10 are operably and optically coupled by an optical fiber 30, for example a polarizing maintaining optical fiber. The optical fiber 30 can comprise one or more sections of an optical fiber material that are joined together by an optical splice (the "X" on FIG. 1) or other means as known to those skilled in the art. As to the illustrated bare ends of the optical fiber 30, such ends are typically cleaved at an angle so as to minimize optical reflection or lasing therefrom. In FIG. 1 reference numeral 30 is used to generally identify an optical fiber for optically coupling components of the present invention, however, when reference is being made to a specific optical fiber that is optically coupled to a specific component(s) then the reference numeral will further include an alpha character so as to uniquely identify this fiber in FIG. 1 and the following.

Before providing a more detailed description of the superfluorescent source 10, including the components or features thereof, the overall operation of such a superfluorescent source including the general function of the components thereof is first discussed. The seed source 20 generates a optical signal or light output that is generally characterized as being broadband having a range of pre-selected wavelengths/frequencies and as having no particular polarization state. This light output, hereinafter the seed source optical input, is fed to the modulator 40. Although the optical signal or light is considered broadband it is common practice to characterize or describe a broadband output by referring to a specific wavelength or frequency being outputted within the range. The output of the source 10 output is preferably broadband, e.g., has a bandwidth of the range of wavelengths of at least 20 nm, and in embodiments described herein, is about 20–40 nm or about 21–50 nm.

The modulator 40 processes the seed source optical input and outputs a portion of the seed source optical input therefrom. More particularly, the seed source optical input is processed such that only that portion of the optical input which has a particular polarized state is outputted from the modulator 40. For example, the modulator 40 passes the seed source optical input that is horizontally polarized and blocks the seed source optical input having a vertical polarization state.

In more particular embodiments, the modulator 40 also is configured to modulate the optical output from the modulator so that only a part of the seed source optical input having a particular polarized state is passed through the modulator. For example, the modulator passes only 50% of the horizontally polarized seed source light and in effect blocks the other 50% along with vertically polarized seed source light. As discussed below, this modulation provides a mechanism by which the modulator 40 can reduce the amount of amplitude fluctuation or noise in the superfluorescent light or the optical output 70 of the superfluorescent source 10.

The polarized optical output from the modulator 40 is fed to the PM amplifier 50. The PM amplifier 50 increases the intensity of the polarized optical output from the modulator 40 and provides an amplified polarized optical output therefrom. This amplified polarized optical output also is maintained in a polarized state, although it can be a different polarized state (e.g., orthogonal) than that which characterizes the modulator optical output.

A small part of the amplified polarized optical output from the PM amplifier 50 is preferably tapped or drawn off, which part is representative of the intensity of the amplified polarized optical signal. This small part is inputted to a feedback loop 110 that in turn generates a feedback control signal to the modulator 40. The modulator 40 responsive to the feedback control signal adjusts the amount of the seed source optical input having a particular polarized state that is to be outputted by and passed through the modulator. The amplified polarized optical output less the small part tapped off comprises the superfluorescent light or optical output 70 of the superfluorescent source 10.

As indicated above, and with particular reference to FIG. 1, the superfluorescent source 10 of the present invention includes the seed source 20, modulator 40 and PM amplifier 50, the details of which are as follows. The seed source 20 includes a light source 22 that is configured to produce a light at a preselected wavelength and a first doped optical fiber 28 that is operably and optically coupled to the light source. The light source 22 is a pump diode as is known to those skilled in the art that is capable of providing an optical output having a pre-selected wavelength in, for example, the visible, infrared, or ultraviolet light spectral regions. This, however, shall not be construed as a limitation, as any source capable of producing an optical output at or about a pre-selected wavelength can be used consistent with the capability of this optical output to excite the first doped optical fiber 28 as hereinafter described.

The first doped optical fiber 28 is an optical fiber that is doped with a pre-selected gain material or dopant. The pre-selected gain material is any material known in the art that is capable of producing an amplified spontaneous emission (ASE) over a desired range of wavelengths responsive to the light outputted from the light source 22. As is known to those skilled in the art, the light from the light source 22 is absorbed by the gain medium, i.e., the first doped optical fiber 28 to produce the ASE and this is what creates the gain. In specific embodiments, the pre-selected gain material includes one or more rare-earth elements such as erbium, holmium, neodymium, praseodymium and ytterbium, for example. The wavelength of the ASE for a doped optical fiber varies depending upon the dopant or pre-selected gain material being used. For example, a ytterbium doped optical fiber will emit light at about 1050 nm and an erbium doped fiber will emit light at about 1550 nm.

In a particular exemplary embodiment, the light source 22 is a pump diode emitting light at about 980 nm, typically a narrow band output at about 980 nm, and the pre-selected gain material or dopant for the first doped optical fiber 28 is erbium. In such a case, the erbium doped optical fiber produces an ASE at about 1550 nm responsive to the 980 nm light from the light source. Also, the ASE from the first doped optical fiber 28 is counter propagated in the first doped optical fiber, in other words propagated in a direction that is opposite to that in which the light from the light source 22 is injected or launched in the first doped optical fiber.

In the illustrated embodiment, the first doped optical fiber 28 is formed in a continuous loop to provide a sufficient length of the first doped optical fiber while proving a relatively compact structure. It is within the scope of the present invention, however, for the first doped optical fiber to be arranged in any geometric configuration and/or optical configuration adaptable for use in accordance with the teachings of the present invention. In an exemplary embodiment, the first doped optical fiber 28 is formed in a continuous serpentine loop having an overall or total length in the range of 5–10 m.

In more particular embodiments, the seed source 20 also includes a wavelength division multiplexer (WDM) coupler 24, the WDM coupler 24 is operably and optically connected to the light source 22, the first doped optical fiber 28 and an isolator 32. The WDM coupler 24 is configured and arranged so that the light outputted by the light source 22 is propagated directly to the first doped optical fiber 28 and so that the counter propagating ASE from the first doped optical fiber 28 is passed onto or cross-coupled to another optical fiber 30a that optically couples the WDM coupler to the isolator 32. Although a WDM coupler 24 is illustrated this is not a limitation as it is within the scope of the present invention to use any type of coupler which is capable of cross coupling, or transferring, an optical signal from one optical fiber to another optical fiber.

The isolator 32 is configured so as to allow the optical output from the WDM coupler 24 to propagate therethrough and to block counter propagating optical signals and the like of the superfluorescent source 10 from being feedback into the seed source 20. In this regard, it is within the scope of the present invention to use any of a number of optical isolators as are known in the art in the present invention used. The optical output from the isolator 32 comprises the seed source optical input.

The modulator 40, as indicated above, is configured to process the seed source optical input and to provide a polarized optical output therefrom that is characterized by having a particular polarized state, for example, all the optical output therefrom is in a horizontally polarized state. In an exemplary embodiment the modulator 40 is an electro-optic $LiNbO_3$ modulator, however this is not meant to be limiting, as any type of instrument capable of polarizing light can be adapted for use in the superfluorescent source 10 of the present invention. In a more particular embodiment, the $LiNbO_3$ modulator is a proton exchanged $LiNbO_3$ Mach Zehnder interferometer. The seed source optical input from the isolator 32 is propagated to the modulator 40 by means of an interconnecting optical fiber 30.

In addition to providing a polarized optical output, and as also indicated above, the modulator 40 is further configured to modulate the amount of polarized optical output being outputted therefrom. Specifically, the amount of the seed source optical input having the particular polarized state, which is allowed to pass through the modulator 40 is controlled by appropriately adjusting the voltage being applied to the electrodes that are connected to the $LiNbO_3$ crystal. In an exemplary embodiment, the modulator 40 is configured so the modulator 40 outputs approximately one-half of the seed source optical input having the particular polarized state.

The PM amplifier 50, as indicated above, is configured so as to increase the intensity of the polarized optical output from the modulator 40 and to provide an amplified polarized optical output therefrom. As also indicated above, this polarized optical output from the modulator 40 is propagated via an optical fiber 30 to the PM amplifier 50.

In an exemplary embodiment the PM amplifier 50 includes a beamsplitter 52, an amplifier light source 54 that produces light at a preselected wavelength, a second doped optical fiber 60 that is doped with another preselected gain material and a retro-reflecting orthogonal polarization converter 62. As indicated above, and described in the following, these components of the PM amplifier 50 are operably and optically coupled by means of optical fibers 30.

The beamsplitter 52 is any one of a number of devices known in the art that is configured and arranged so the polarized optical output from the modulator 40 that has the particular polarized state and being propagated in a first optical pathway to the beamsplitter 52 passes through the beamsplitter and so the counter-propagating orthogonally polarized amplified optical output from the PM amplifier 50, is directed to exit the beam splitter into a second optical pathway. In the illustrated embodiment, the second optical pathway is generally perpendicular (e.g., at a 90° angle) to the first optical pathway. In an exemplary embodiment, the beamsplitter 52 is a polarizing beamsplitter as is known to those skilled in the art.

Although the counter-propagating, amplified polarized optical output of the PM amplifier 50 is illustrated in FIG. 1 as leaving or exiting the beamsplitter 52 into the second optical pathway generally perpendicular to the direction of the polarized optical output from the modulator 40 this is not a limitation as it is within the scope of the present invention for the amplified polarized optical output to exit the beamsplitter at any angle, other than parallel, with respect to the direction of the polarized optical output from the modulator 40.

The polarized optical output from the modulator 40, passing through the beamsplitter 52 is inputted into the optical signal amplification portion of the PM amplifier that includes an amplification light source 54 and a second doped optical fiber 60. The light from the amplification light source 54 is injected into an optical fiber using any of a number of techniques known to those skilled in the art. One such technique is illustrated in FIG. 1, wherein the light from the amplification light source is injected or launched through the side of an optical fiber thus leaving the ends of the fiber accessible for input and output coupling.

In a more specific embodiment of this technique, a V-groove or a micro-prism is formed, machined or otherwise provided in the side of the optical fiber, as is known in the art and appropriate for the intended use, so as to form a V-grooved optical fiber 56. The light emerging from the amplifier light source 54 propagates laterally through the fiber and impinges on the sides of the groove. The vertical rays impinging on the facets of the groove are reflected and directed along the horizontal axis of the fiber, in a double clad fiber, along the horizontal fiber axis of the outer core. Reference shall be made to U.S. Pat. No. 5,854,865, the teachings of which are incorporated herein by reference, as to further details regarding the construction and arrangement of the V-grooved optical fiber 56. See also Goldberg, L. et al., V-groove side-pumped 1.5-$\mu$M fiber amplifier. Proc. CLEO-96 volume 9, pages 208–209, paper CtuU1, 1996, the teachings of which are incorporated herein by reference.

The amplification light source 54 is configured to produce a light at a pre-selected wavelength, more specifically a wavelength that results in an ASE when the light of the pre-selected wavelength is injected or launched into the second doped optical fiber 60. In an exemplary embodiment, the amplification light source 54 is a pump diode as is known to those skilled in the art that is capable of outputting an optical output having a pre-selected wavelength in, for example, the visible, infrared, or ultraviolet light spectral regions. This, however, shall not be construed as a limitation, as any source capable of producing an optical input at a defined wavelength can be used.

The light injected into the V-grooved optical fiber 56 from the amplification light source 54, along with the polarized optical output from the modulator 40 passing through the beamsplitter 52, propagates through the V-grooved optical fiber into the second doped optical fiber 60. In an exemplary embodiment, the second doped optical fiber 60 is a double-clad optical fiber that is doped with a pre-selected gain material or dopant.

The pre-selected gain material is any material known in the art that can produce amplifier gain at a desired wavelength responsive to the light being outputted from the amplification light source 54 as well as increasing the intensity of the polarized light being outputted by the modulator 40. In specific embodiments, the pre-selected gain material includes one or more rare-earth elements such as erbium, holmium, neodymium, praseodymium and ytterbium, for example. The rare-earth dopant in the second doped optical fiber 60 should be selected so as to generally correspond to the dopant in the first doped optical fiber 28 fiber of the seed source 20 such that the fiber gain of the second doped optical fiber 60 provides gain for the optical output from the modulator 40 and thus also the optical output from the seed source 20.

In a particular exemplary embodiment, the amplification light source 54 is a pump diode emitting light at about 980 nm and the pre-selected gain material or dopant for the second doped optical fiber 60 is a combination of erbium and ytterbium, where erbium is the principal dopant. In such a case, the second doped optical fiber produces an optical broadband output at about 1550 nm responsive to the 980 nm light from the amplification light source thereby amplifying the polarized light from the modulator 40. The amplified polarized light from the modulator 40 is propagated through the second doped optical fiber 60 towards the retro-reflecting orthogonal polarization converter 62.

In the illustrated embodiment, the second doped optical fiber 60 also is formed in a continuous loop to provide a sufficient length of the second doped optical fiber for producing the desired amplifier gain while providing a relatively compact structure. It is within the scope of the present invention for the second doped optical fiber 60 to be arranged in any geometric configuration and/or optical configuration adaptable for use in accordance with the teachings of the present invention. In an exemplary embodiment, the second doped optical fiber 60 is formed in a continuous serpentine loop having an overall or total length in the range of 5–10 m.

The amplified optical signal or output exiting the second doped optical fiber 60 is then propagated to the retro-reflecting orthogonal polarization converter 62, which reflects this amplified optical output such that it counter propagates back through the second doped optical fiber. In addition to reversing the direction of propagation, the retro-reflecting orthogonal polarization converter 62 also reflects the amplified optical output in an orthogonally polarized state. In particular, the retro-reflecting orthogonal polarization converter 62 reflects the amplified optical output such that it is in an orthogonal polarization state different from that of the polarization state of the optical output from the modulator 40.

In a specific exemplary embodiment the retro-reflecting polarization converter 62 is a Faraday mirror retro-reflector as is taught and disclosed in U.S. Pat. No. 5,303,314, the teachings of which are incorporated herein by reference. See also Duling, I. N. and Esman, R. D. Single-Polarisation Fiber Amplifier, Electronics Letters 28(12), pages 1126–1128, 1992, the teachings of which are incorporated herein by reference, which discloses a Faraday mirror including a 45° Faraday rotator and a conventional mirror. This specific exemplary embodiment, however, shall not be construed as a limitation as it is within the scope of the present invention, for any type of device that is capable of reflecting the light in an orthogonal polarization state can be adapted for use in the superfluorescent source 10 according to the present invention.

The reflected amplified polarized optical output counter-propagates back through the second doped fiber 60 and through the V-grooved optical fiber 56 to the beamsplitter 52. As the reflected amplified polarized optical output counter propagates back through the second doped optical fiber 60, this optical output or signal is further or additionally amplified on its second pass through the second doped optical fiber. As indicated above, the reflected amplified polarized optical output corresponds to the light exiting the beamsplitter 52 into the second optical pathway. According to one aspect or embodiment of the present invention, the reflected amplified polarized optical output light from the beamsplitter 52 comprises the optical output 70 of the superfluorescent source 10.

In a particularly preferred embodiment, the PM amplifier 50 is operated at saturation. Such a configuration for the superfluorescent source 10 provides a mechanism that significantly reduces relative intensity noise (RIN) without a consequent decrease in the power or intensity of the optical output 70 of the superfluorescent source 10. In a specific embodiment, such a configuration yields a high power, broadband superfluorescent light source, for example having a power output up to approximately 100 mW, in which RIN is reduced by, for example 2–3 orders of magnitude, at low frequencies, for example less than 1,000 kHz as compared to the prior art. The RIN is preferably reduced into the MHz range. In contrast to the present invention, prior art techniques to reduce RIN have tended to reduce RIN at the expense of greatly reduced power output or limiting the bandwidth, for example less than 100 kHz, over which the RIN reduction occurred.

According to a second aspect of the present invention the superfluorescent source 10 further includes a control mechanism that is configured and arranged so as to automatically adjust or modulate the polarized optical output from the modulator 40 thereby adjusting or modulating the optical output 70 of the superfluorescent source to a desired value. In this way, fluctuations in the optical output 70 due to RIN and component degradation because of aging, for example, and other amplified fluctuations are automatically compensated for by the control mechanism.

In an exemplary embodiment, and as illustrated in FIG. 1, the control mechanism includes a polarization maintaining (PM) optical tap 80 and a feedback loop 110 that are operably and optically interconnected to each other by means of a polarization maintaining optical fiber 100. The PM optical tap 80 is any of a number of devices or couplers known in the art that cross couple or transfer an optical signal from one optical fiber to another optical fiber. The PM optical tap 80 is more particularly configured so a portion of the polarized amplified optical output from the PM amplifier 50, as it passes through the PM optical tap 80 (tapped-off portion), is re-directed (e.g., tapped off or sampled) into the polarization maintaining fiber 100 and inputted into the feedback loop 110. The tapped-off portion, is representative of the intensity of the amplified polarized optical output from the PM amplifier 50.

The feedback loop 110 includes a detector 112 and a feedback loop amplifier 114 that are electrically interconnected to each other. The detector 112 is optically and operably connected to the polarization maintaining fiber 100 so that the tapped-off portion of the amplified polarized optical output from the PM tap 80 is inputted to the detector. The detector 112 is any of a number of optical detection devices known in the art that converts an inputted optical signal or light into an electrical signal or voltage, that is proportional to the intensity of the detected optical signal or light as well as the intensity of the main beam from which the portion is tapped off. Thus, in the present invention the detector 112 outputs an electrical signal or voltage to the feedback loop amplifier 114, that is representative of the intensity of the amplified polarized optical output exiting the PM amplifier 50.

In the illustrated embodiment the feedback loop amplifier 114 is a noise feedback AC amplifier, however, this is not a limitation as it is within the scope of the present invention to use other amplifiers known in the art that are adaptable for use in the present invention. The electrical signal or voltage that is representative of the intensity of the amplified optical output from the detector 112 is appropriately amplified by the feedback loop amplifier 114 so as to provide an electrical control signal to the modulator 40 that adjusts or modulates the optical signal transmissivity of the modulator.

The detector 112 and amplifier 114 making up the feedback loop 110 serve as a mechanism to monitor the amplified polarized output from the PM amplifier 50 and to reduce the noise in the optical output 70 as well as to reduce or compensate for amplitude variations in this output that arise for any of a number of other reasons such as those attributable to age related component degradation. For example, if the intensity or power of the amplified polarized optical output increases beyond a desired value, the tapped-off portion will be at a correspondingly higher intensity. Consequently, the detector 112 and feedback loop amplifier 114 will output an electrical control signal or voltage to the modulator 40 that in turn decreases the optical signal transmissivity of the modulator 40, thus also decreasing the intensity or power of the optical output 70.

In the case of an electro-optic modulator, the feedback amplifier 114 outputs an electrical signal or voltage to the electro-optic modulator that adjusts the voltage being applied to the crystal therein, thereby adjusting the transmissivity of the crystal. Thus, for example, if the intensity or power of the amplified optical output from the beamsplitter increased from a desired value then the feedback loop 110 would adjust the voltage being applied to the crystal within the modulator 40 so as decrease the amount of light being transmitted through the crystal, consequently causing a decrease in the power or intensity of the optical output 70. In sum, the feedback loop 110 provides a mechanism to control noise in the optical output 70 and to control power fluctuations by directly adjusting or modulating the transmissivity of the modulator 40.

In an exemplary embodiment, the PM optical tap 80 is configured so that approximately 5% of the amplified polarized optical output from the PM amplifier 50 is tapped off and inputted to the feedback loop 110. This percentage, however, is not a limitation and any percentage can be tapped as is necessary to achieve the appropriate feedback response. Additionally, the transmissivity of the modulator 40 is adjusted so that normal operation of the modulator lies within a linear operational band of the modulator. In an exemplary embodiment for an electro-optic modulator, the voltage being applied to the crystal within the modulator is set so that approximately one-half of the light inputted to the modulator having the particular polarized state is passed through the modulator when the polarized amplified optical output from the PM amplifier 50 is at the desired value. In this way, the optical output from an electro-optic modulator varies about the one-half transmissivity value responsive to power fluctuations and/or noise in the polarized amplified optical output.

The foregoing shall not be particularly limiting as to the selection of the transmissivity operating point for the modulator 40, as other operational points are contemplated for use in the present invention even though the transmissivity characteristic may not exhibit linearity at or about these points. For example, the modulator 40 can be operated closer to the point of maximum transmission or operated above the quadrature point (½ power transmitted). In a particular configuration of the present invention and when the PM tap 80 is configured to tap-off approximately 5% (i.e., tapping off approximately 3.4 mW) and when the modulator is operated above quadrature, the total modulator insertion loss is reduced by 1 dB.

Figure 2:
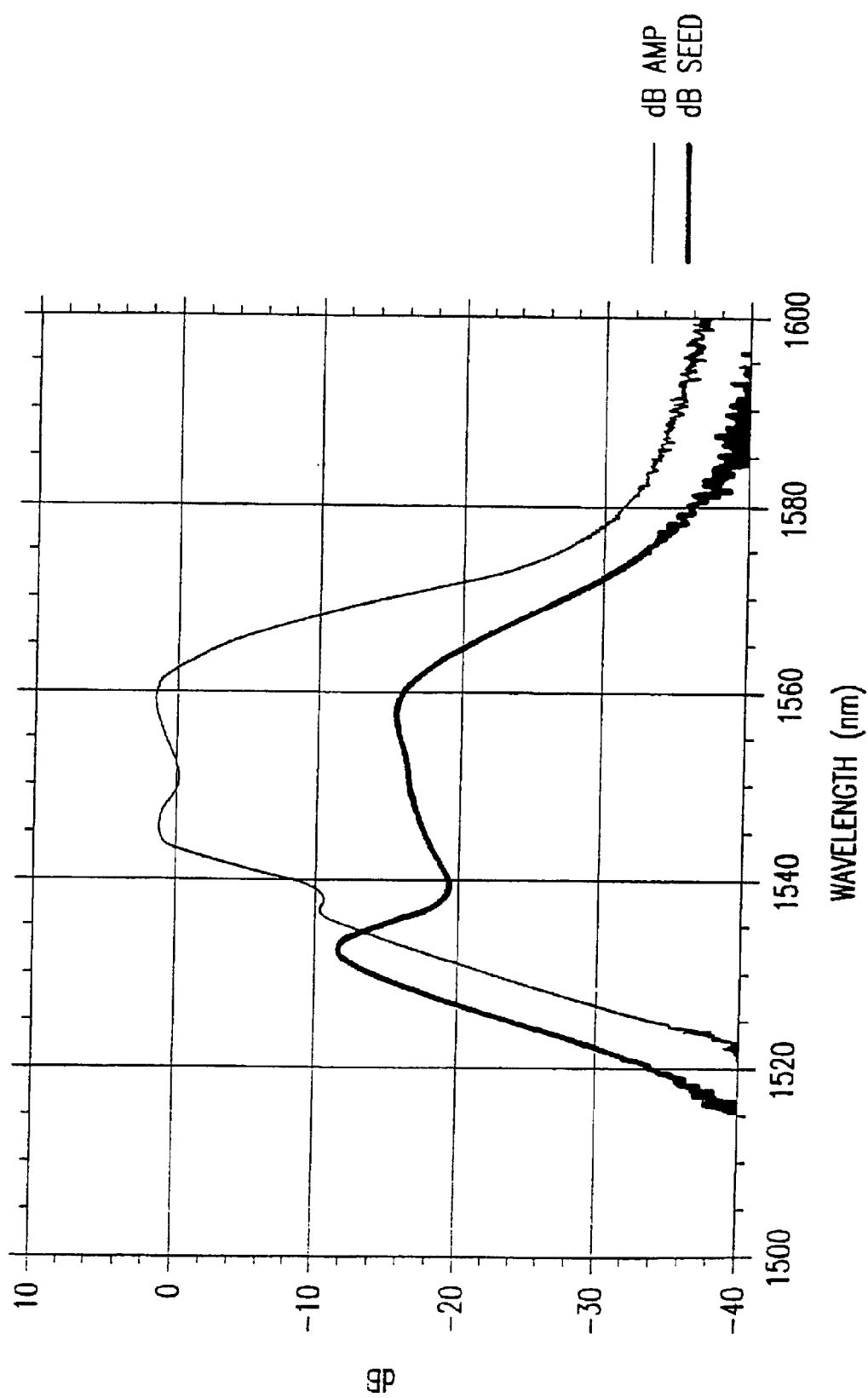
FIG. 2 is a graph showing the broadband optical outputs of an exemplary seed source with and without polarization maintaining amplifier.
Figure 3:
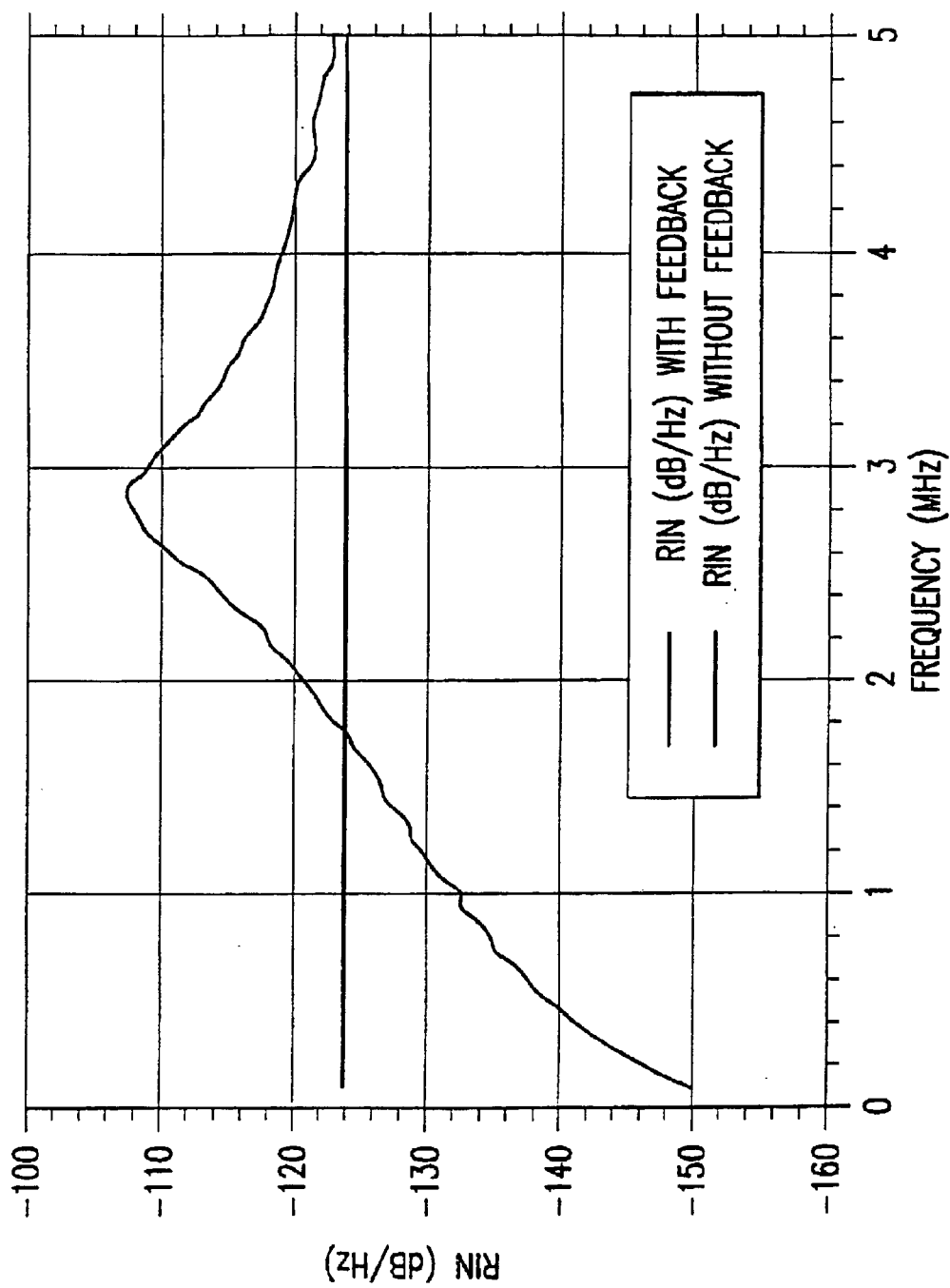
FIG. 3 is a graph showing the frequency response of RIN, with and without a feedback circuit being implemented, where the frequency response of the detector has been normalized out.
Figure 4:
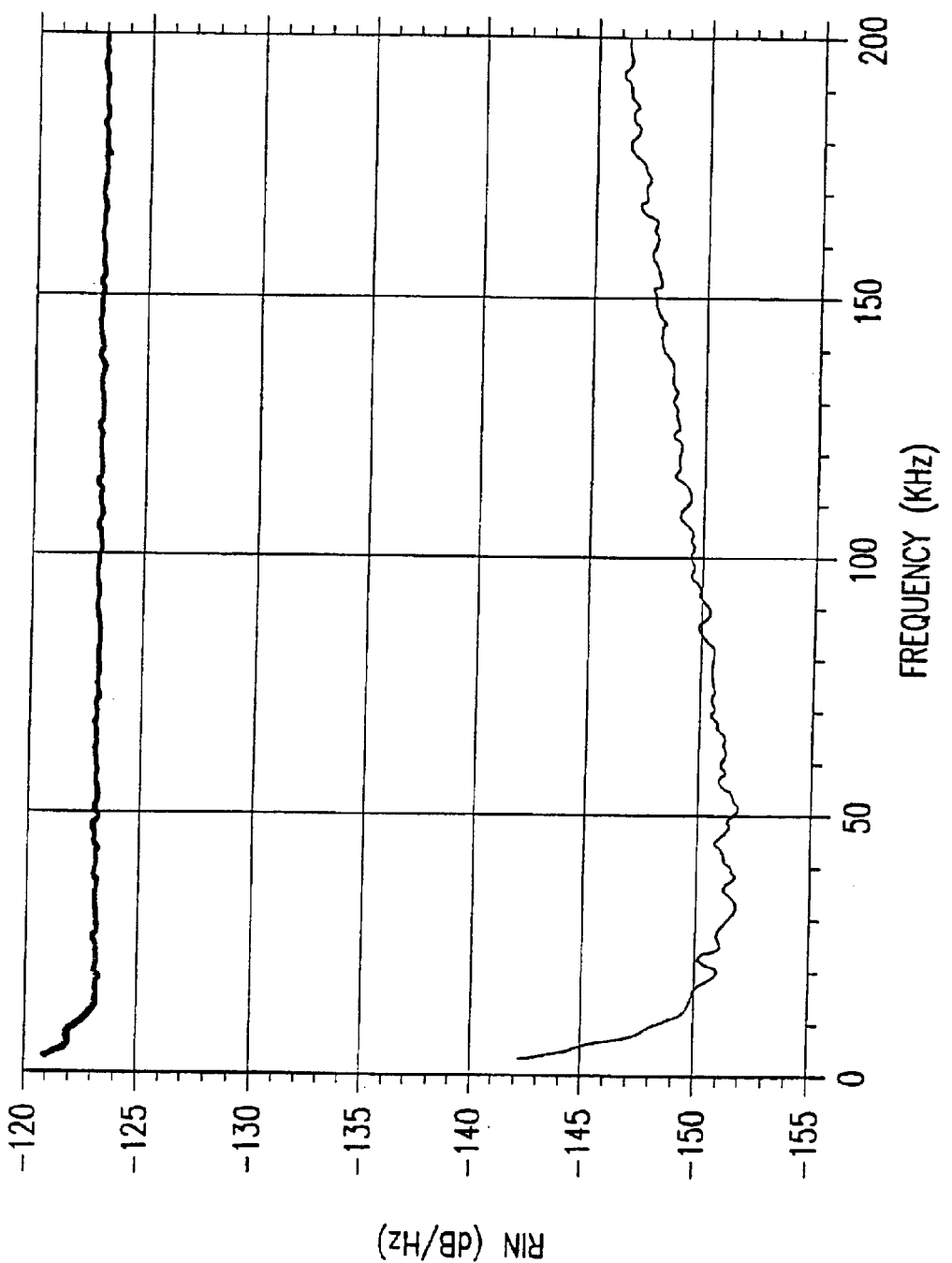
FIG. 4 is an exploded view of the data from FIG. 3 plotted to 200 kHz.

There is shown in FIGS. 2–4 optical outputs and RIN reductions for the high power, low noise superfluorescent source 10 of FIG. 1. Referring now to FIG. 2, there is shown the broadband optical outputs of the seed source 20 and the PM amplifier 50. As shown therein, with a 254 mA drive current to the pump diode comprising the seed source light source 22, the optical output from the seed source 20 has a bandwidth of 32 nm and an output power into the modulator 40 of approximately 20 mW. As also shown therein, with a 2.8 A drive current to the pump diode comprising the amplifier light source 54, the polarized amplified optical output of the PM amplifier 50 has an output bandwidth of 26 nm and an output power of approximately 67 mW.

The Relative intensity noise (RIN) reduction of the present invention is illustrated in FIG. 3, which shows the frequency dependence of RIN with and without a feedback circuit being implemented in the superfluorescent source 10 of the present invention. As seen therein, at frequencies less than 1.7 MHz, RIN is significantly decreased by the inclusion of a feedback loop in the superfluorescent source 10. This is particularly advantageous for most fiber optic gyroscope applications because such applications typically utilize frequencies below 1 MHz.

There is shown in FIG. 4 an exploded view of the data from FIG. 3 plotted to 200 kHz, which is the primary region of interest for fiber gyros. The maximum RIN improvement at low frequencies (20 kHz) is approximately 28 dB, with improvement persisting to 1.75 MHz.

Although a preferred embodiment of the invention has been described using specific terms, such description is for illustrative purposes only, and it is to be understood that changes and variations may be made without departing from the spirit or scope of the following claims.

What is claimed is:

1. A broadband superfluorescent device comprising:
    a seed source that provides a broadband optical input;
    an amplitude modulator configured and adapted to polarized and amplitude modulate the broadband optical input, the amplitude modulator being operably coupled to the seed source; and
    a polarization maintaining (PM) amplifier operably coupled to the modulator;
    wherein the seed source optical input is polarized in the modulator so that a polarized output is outputted therefrom;
    wherein the polarized optical output of the modulator is inputted to the PM amplifier; and
    wherein the PM amplifier is configured and arranged so as to amplify an intensity of the polarized optical output from the modulator and to output an amplified polarized optical output therefrom.

2. The broadband superfluorescent device of claim 1, wherein the seed source comprises a light source capable of producing a light at a preselected wavelength and an optical fiber doped with a pre-selected gain material operably coupled to the light source.

3. The broadband superfluorescent device of claim 2, wherein said light source capable of producing light at a preselected wavelength is a pump diode.

4. The broadband superfluorescent device of claim 2, wherein the pre-selected gain material is a rare-earth dopant.

5. The broadband superfluorescent device of claim 4, wherein the rare-earth dopant is selected from the group consisting of erbium, holmium, neodymium, praseodymium and ytterbium.

6. The broadband superfluorescent device of claim 4, wherein the rare-earth dopant is erbium.

7. The broadband superfluorescent device of claim 1, wherein the PM amplifier comprises:
   an amplification light source that generates light at a preselected wavelength;
   a second doped optical fiber doped with a pre-selected gain material and being operably coupled to the amplification light source;
   a retro-reflecting orthogonal polarization converter operably coupled to the second doped optical fiber;
   wherein the amplification light source, the second doped optical fiber and the retro-reflecting orthogonal polarization converter are configured and arranged so the PM amplifier amplifies the polarized optical output from the modulator and provides a polarized amplified optical output therefrom.

8. The broadband superfluorescent device of claim 7, further comprising a V-grooved optical fiber being operably coupled to the amplification light source and the second doped optical fiber and wherein the light produced by the amplification light source is injected into the second doped optical fiber via the V-grooved optical fiber.

9. The broadband superfluorescent device of claim 8, wherein the amplification light source is a pump diode.

10. The broadband superfluorescent device of claim 7, wherein the second doped optical fiber is a double-clad optical fiber and wherein the pre-selected gain material is at least one rare-earth dopant.

11. The broadband superfluorescent device of claim 10, wherein the at least one rare-earth dopant is selected from the group consisting of erbium, holmium, neodymium, praseodymium and ytterbium.

12. The broadband superfluorescent device of claim 10, wherein the double-clad optical fiber is doped with erbium and ytterbium.

13. The broadband superfluorescent device of claim 7, wherein the retro-reflecting orthogonal polarization converter is a Faraday mirror.

14. The broadband superfluorescent device of claim 1, wherein the amplitude modulator is a polarizing electro-optic amplitude modulator.

15. The broadband superfluorescent device of claim 14, wherein the amplitude modulator is a proton exchanged $LiNbO_3$ Mach Zehnder interferometer.

16. The broadband superfluorescent device of claim 1, further including a feedback circuit that provides a control signal to the modulator and wherein a portion of the polarized, amplified optical output from the PM amplifier is tapped off from the main beam and processed by the feedback circuit.

17. The broadband superfluorescent device of claim 16, wherein the feedback circuit comprises a detector and an amplifier operably connected to the detector;
   wherein the detector outputs a signal to the amplifier representative of an intensity of an the tapped light;
   wherein the signal from the detector is converted by the amplifier into a control signal that is outputted to the amplitude modulator; and
   wherein the modulator adjusts a transmissivity of the amplitude modulator responsive to the control signal.

18. The broadband superfluorescent device of claim 17, wherein the amplifier is a noise feedback AC amplifier.

19. The broadband superfluorescent device according to claim 1, wherein the broadband optical input provided by the seed source is unpolarized.

20. The superfluorescent device according to claim 1, wherein the broadband optical input provided by the seed source has a plurality of polarizations.

21. The broadband superfluorescent device according to claim 20, wherein the amplitude modulator allows only one of the plurality of polarizations to be transmitted.

22. The broadband superfluorescent device according to claim 1, wherein the polarized output of the amplitude modulator is linearly polarized.

23. The device according to claim 1, wherein the optical input has a bandwidth of at least 20 nanometers.

24. The device according to claim 1, wherein the optical input has a bandwidth of at least 20 nanometers and at most 50 nm.

25. A broadband superfluorescent device comprising:
   a seed source adapted and configured to provide an optical input wherein the seed source includes a light source capable of producing light at a preselected wavelength and a first optical fiber doped with a preselected gain material operably coupled to said light source;
   an amplitude modulator operably coupled to said seed source wherein the broadband optical input from the seed source is polarized and noise reduced in the modulator; and
   a polarization maintaining amplifier operably coupled to said modulator, wherein the polarization maintaining amplifier comprises:
     a polarizing beamsplitter;
     a second light source capable of producing light at a preselected wavelength operably coupled to said beamsplitter;
     an optical fiber doped with a preselected gain material operably coupled to said second light source; and
     a retro-reflecting orthogonal polarization converter operably coupled to said optical fiber;
   wherein the light entering and exiting the polarization maintaining amplifier is maintained in a polarized condition; and
   wherein the intensity of the light entering the polarization maintaining amplifier is increased.

26. The broadband superfluorescent device of claim 25, wherein a portion of the optical output is tapped off from the main beam and passed through a feedback circuit into the amplitude modulator;
   wherein the feedback circuit comprises a detector and an amplifier operably connected to the detector;
   wherein an intensity of the tapped light is determined by the detector;
   wherein the tapped light is converted by the amplifier into an electrical signal which is proportional to the intensity of the tapped light; and
   wherein the electrical signal from the tapped light serves to control a transmissivity of the amplitude modulator.

27. A method for producing a polarized, broadband optical output comprising the steps of:
   providing a broadband optical input;
   polarizing and amplitude modulating said optical input in a amplitude modulator to produce polarized light;
   amplifying the polarized light using a polarization maintaining amplifier to produce a broadband optical output;
   sampling a portion of the broadband optical output and converting the sampled portion to an electrical signal proportional to the signal intensity of the output; and
   controlling the transmissivity of said modulator via said electrical signal produced from said sample portion.

28. The method of claim 27, further comprising a step of sourcing the optical output of polarized, broadband light to a fiber optic gyro.

29. The method of claim 27, further comprising the step of sourcing the optical output of polarized, broadband light to a strain sensing array.

30. A method according to claim 27, wherein the optical input has a bandwidth of at least 20 nm.

31. A method according to claim 27, wherein the optical input has a bandwidth of at least 26 nm.

32. A method for reducing the relative intensity noise in an optical output of polarized, broadband light comprising the steps of:

providing an broadband optical input;

polarizing and amplitude modulating said broadband optical input in an amplitude modulator to produce polarized light;

amplifying the polarized light using a polarization maintaining amplifier;

sampling a portion of the optical output and converting the sampled portion to an electrical signal proportional to the signal intensity of the output; and controlling the transmissivity of said modulator via said electrical signal.

33. A method for producing a polarized, broadband optical output comprising:

providing an optical input having a bandwidth of at least 20 nm;

polarizing and amplitude modulating the optical input to produce amplitude-modulated, polarized light;

amplifying the polarized light using a polarization maintaining amplifier to produce a broadband optical output.

34. A method according to claim 33, wherein the optical input having a bandwidth of at least 20 nm is unpolarized.

35. A method according to claim 33, wherein the amplitude-modulated, polarized light is linearly polarized.

36. A method according to claim 33, wherein the broadband optical output is linearly polarized.

37. A method according to claim 33, further comprising:

controlling a transmissivity of the amplitude modulator by providing feedback to the amplitude modulator based on a signal intensity of the optical output.

* * * * *